Patented July 16, 1929.

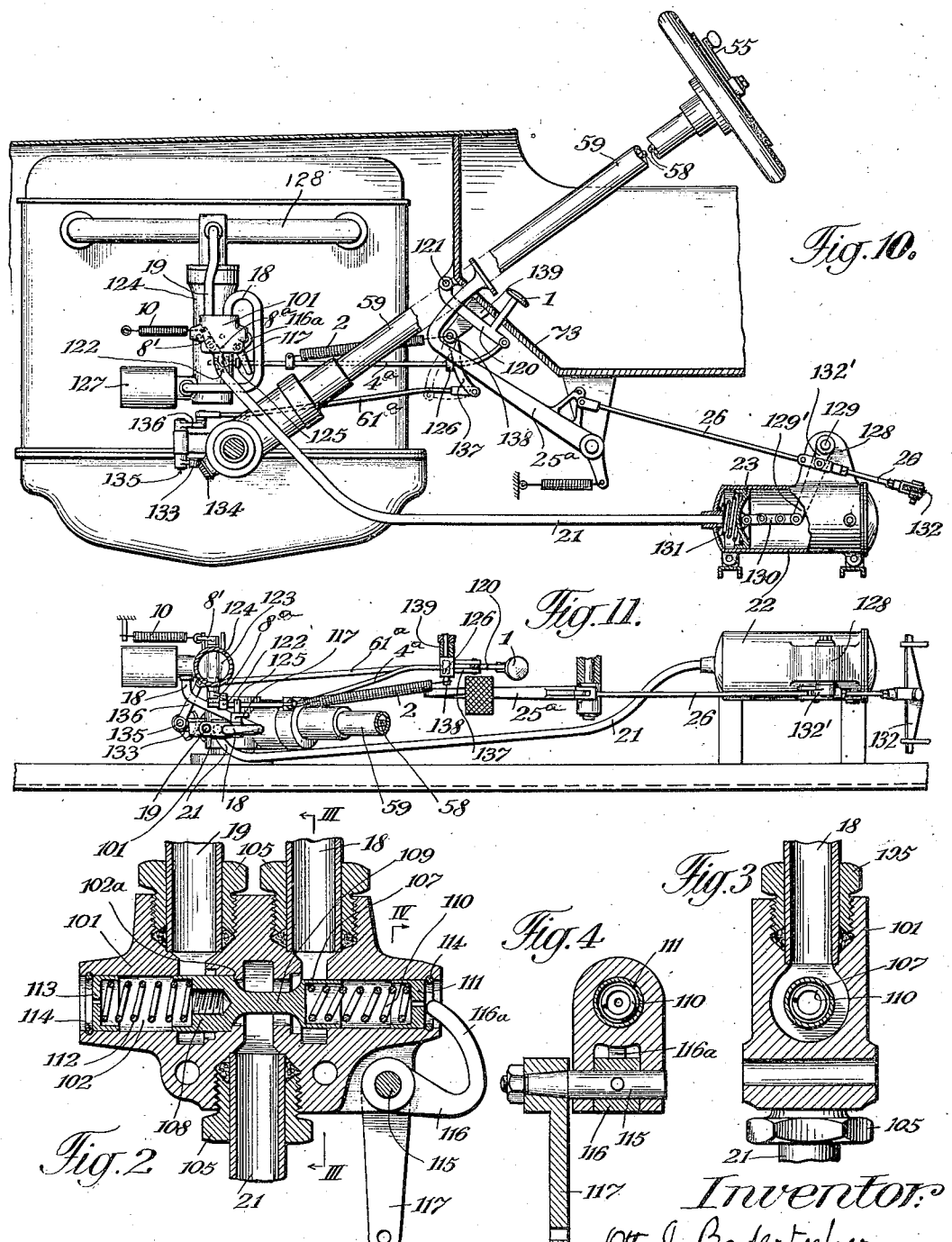

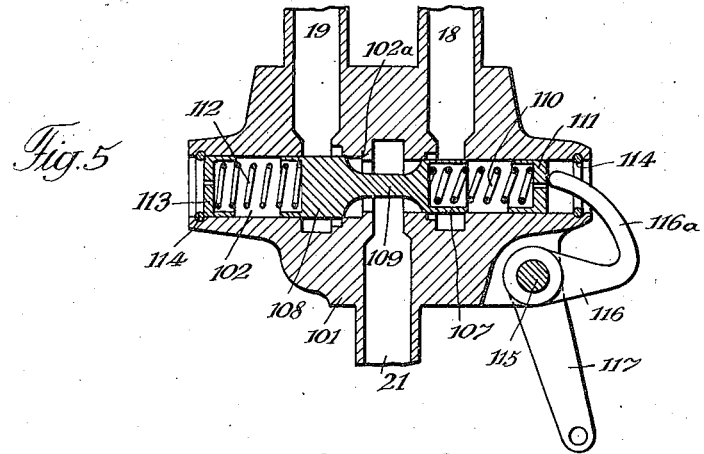
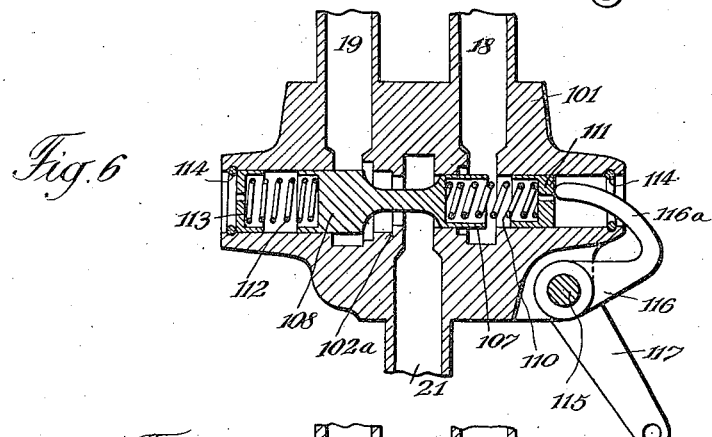
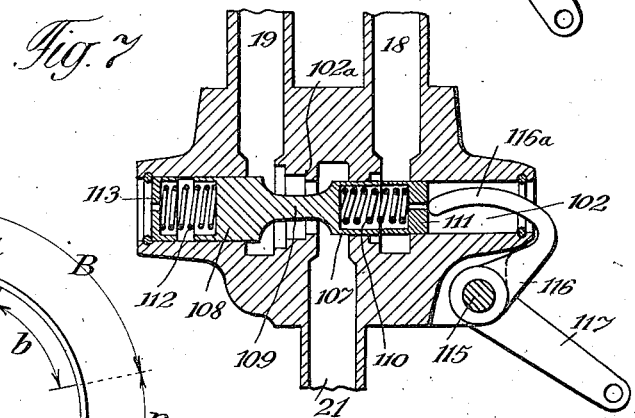
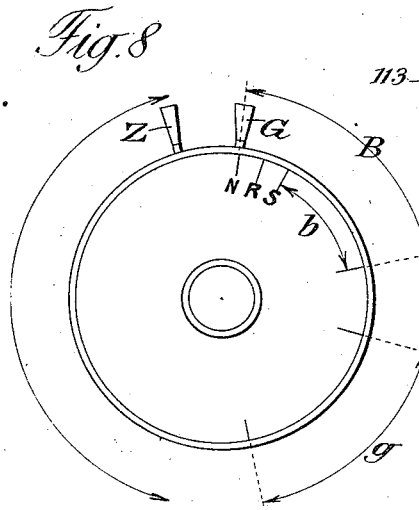

1,721,290

UNITED STATES PATENT OFFICE.

OTTO J. BADERTSCHER, OF ZURICH, SWITZERLAND.

VACUUM SERVO-BRAKE FOR MOTOR-DRIVEN VEHICLES.

Application filed December 2, 1926, Serial No. 152,090, and in Switzerland December 14, 1925.

Vacuum servo-brakes on motor driven vehicles are known with which the action of the servo-brake is controlled either by means of the brake pedal or by actuating levers or pedals specially provided to that end. These known arrangements present various disadvantages. In case a special controlling device, such as a hand lever or a pedal, is provided, it involves an undesirable increase of the levers and handles already present in large numbers in a modern car and the driver is often compelled to release important devices, such as the gas controlling device or devices for actuating a signal, in order to operate the device for controlling the servo-brake. This may lead to a fatal delay of the braking action. If the actuation is effected by means of the brake pedal, in order to render the servo-brake operative, a change between the gas pedal or accelerator pedal and the brake pedal has to be effected which change in case of emergency may lead to dangerous actions as for instance the foot of the operator may slip off the brake pedal and may depress the gas pedal so that the car instead of being braked suddenly dashes forward. There is a further objection that the actuation of the servo-brake by means of the brake pedal does not permit finely graduated brake actions owing to the lack of support of the foot on the floor and the fact that the foot has to follow the swinging movements of the car whereby a jerky braking action results.

These drawbacks are now overcome by the present invention which is characterised in that the gas controlling devices, i. e. the accelerator pedal and the throttle control hand lever, are used as devices for controlling the servo-brake mechanism; whereby the same devices which serve to accelerate the car serve also to brake it. This overcomes the above mentioned drawbacks and secures the advantages of a simplified and handier operation of the car and of an automatic braking action in emergencies inasmuch as the braking action is rendered operative when the accelerator pedal is released so that the car is automatically braked when, for instance, the operator loses control owing to a sudden indisposition. The starting on an incline is facilitated as by depressing the gas pedal the brake is first released and gas is given immediately afterwards so that the difficult manipulation with the hand brake is avoided. The braking of the car is rendered as easy and requires as little power as the acceleration.

Constructional examples of the subject matter of the present invention are illustrated on the accompanying drawings, in which:

Fig. 2 shows the regulating valve in a vertical longitudinal section;

Fig. 3 is a cross-section along line III—III in Fig. 2;

Fig. 4 is a section along line IV—IV in Fig. 2;

Figs. 5, 6 and 7 show in diagrammatic longitudinal sections the regulating valve in different working positions;

Fig. 8 shows in a diagrammatic manner the positions of the throttle valve control lever or gas lever;

Fig. 10 shows in elevation with parts shown in section the installation of the servo-brake mechanism in a motor car of the Buick type and Fig. 11 is a plan view with parts shown in section of Fig. 11.

Figure 1:
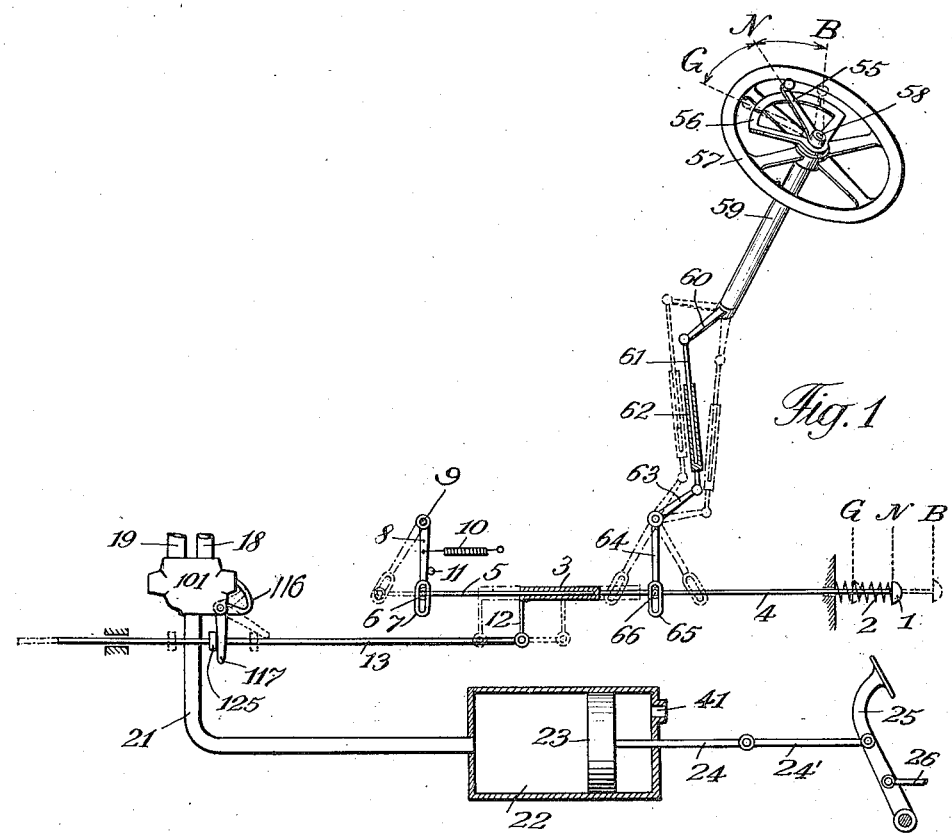
Fig. 1 shows in a diagrammatic manner one constructional example of the braking arrangement according to the present invention.

Referring now first to the constructional example diagrammatically illustrated in Fig. 1, 1 denotes the gas pedal or accelerator pedal with the return spring 2. The accelerator pedal is operatively connected to the regulating valve and is connected by means of a lost motion device to the throttle valve. The lost motion device is shown as comprising a sleeve 3 fixed to the end of the accelerator rod 4 and a rod 5 displaceable in the sleeve 3, the free end of the rod 5 carrying a pin 6 guided in a slotted part 7 of the lever 8 by means of which the operating shaft 9 of the throttle valve is actuated. A spring 10 acts upon the lever 8 and tends to press the latter against a stop 11. At the end of the sleeve 3 an arm 12 is provided to which a rod 13 provided with a collar 125 is linked, the latter cooperating with the lever 117 of the regulating valve indicated at 101 which will be described hereinafter. The regulating valve is connected to a pipe 18 for atmospheric pressure and is connected by pipe 19 to a source of suction by a pipe 21 to the cylinder 22 of the servo-motor, the piston 23 of which is connected by means of a rod 24 to the brake pedal 25. 26 indicates the ordinary connection between the brake pedal and the brake gear so that the force acting on the servo-motor piston is transmitted to the brake gear by the brake pedal. In practice this connection to the brake pedal itself may not always be feasible, but for purposes of explanation of the invention this connection is sufficient.

Figs. 2–8 show the regulating valve. 101 denotes the valve casing made of cast-iron and provided with a longitudinal bore 102. At right angles to the longitudinal axis the pipe 18 leading to atmosphere and the suction pipe 19 communicate with the bore 102 to form ports admitting atmospheric pressure and suction; the pipes are connected to the casing 101 by means of stuffing boxes 105. Between the pipes 18 and 19 and on the opposite side of the bore 102 is arranged the pipe 21 which leads to the cylinder 22 (Fig. 1) of the servo-brake and is also connected to the casing 101 by means of a stuffing box 105. A differential piston 107/108 is slidable in the bore 102, the two pistons 107 and 108 being connected to each other by means of a rod 109; the piston 108 controlling the suction inlet having a larger diameter than the piston 107 controlling the inlet of atmospheric pressure and bearing against a shoulder 102$^a$ when the piston is in its position of rest. Each piston forms a cup for a helical spring 110 and 112 respectively which at their other ends rest in cups 111 and 113 respectively the spring 110 being considerably stronger than the spring 112. The latter serves only for returning the differential piston into its position of rest as well as for overcoming the frictional resistances which otherwise might influence the accuracy of regulating the braking action. The spring 110 has an initial tension which approximately corresponds to the resistance which the spring 112 generates at the beginning of the compression. Rings 114 are inserted in the bore 102 for limiting the movement of the cups 111 and 113. At one end of the casing 101 and transverse to the bore 102 and below the latter a shaft 115 is mounted on which is fixed an arm 116 provided with an extension 116$^a$ which, by a turning motion of the shaft 115 enters the bore 102 and displaces the spring cup 111 and thereby the differential piston. At the end of the axle 115 projecting beyond the casing is fixed an arm 117 with which the rod 13 cooperates.

Fig. 2 shows the parts of the valve in their position of rest. Fig. 5 shows the valve parts positioned for suspending of the braking action, Fig. 6 the position for normal braking action and Fig. 7 the position for a quick or emergency braking effect.

The explanation of the manner of operation of the regulating valve may be given with reference to Figs. 5–7 and 8. In Fig. 8 G denotes the throttle control hand lever or hand gas lever, and Z the ignition lever. The extent of angular movement of the hand gas lever G is subdivided into a range $g$ in which the regulations of the gas from a maximum gas supply to the cut-off occurs, into a range $n$, in which the elements of the regulating valve are in the position for releasing the braking action and into a range B, which is again subdivided into a larger part $b$ for normal braking and a smaller part S—N for special braking action. As is seen in Fig. 1 the actuating lever 117 of the regulating valve is connected to the hand gas lever as well as to the accelerator. During travel the hand gas lever is adjusted in the range $g$ so that the parts of the regulating valve occupy the position indicated in Fig. 2, in which the servo-brake is inoperative. If it is intended to brake the vehicle the supply of gas is first of all cut off by turning the hand gas lever into the range $n$. When the lever is further turned over the range $n$ the arm 116 presses on the cup 111 and displaces thereby the differential piston into the position indicated in Fig. 5 in which the admission of atmospheric air is cut off although no braking action yet takes place. If now the gas lever is turned into the part $b$ of the range B, the arm 116 further displaces the differential piston 117/118, thereby compressing the spring 112 into the position shown in Fig. 6 and opens thereby the suction inlet whereby vacuum is admitted to one side of the brake cylinder 22 and the brake operated.

In the brake cylinder 22 a certain suction is then present which also acts upon the inner faces of the differential piston and returns the latter through overcoming the opposing force of the spring 110 and compressing the latter towards the right, whereby the suction inlet is again closed. As soon as the unavoidable leakage losses reduce the vacuum in the brake cylinder and thereby the braking action, the power of the spring 110 urges the differential piston towards the left so that the suction inlet is again uncovered whereupon the above described action is repeated. In this manner the pressure in the brake cylinder is kept constant during every adjustment of the gas lever.

According to the condition of the road, i. e. if the vehicle has to be braked in snowy or rainy weather, the gas lever is turned up to S or N whereby a larger uncovering of the suction inlet is obtained and a correspondingly increased braking effect results; for obtaining a quick or emergency braking action the gas lever is turned directly to the position N whereby the parts of the valve occupy the positions shown in Fig. 7 and a maximum braking effect is obtained. When the gas lever is returned into the neutral position for suspending the braking action the spring 112 causes the differential piston to return into the position indicated in Fig. 2.

In practice immediately after starting the vehicle the gas lever is adjusted into the desired braking range and the control of the gas supply and of the braking is effected by means of the accelerator whereby the adjustment of the gas lever limits the obtainable maximum braking effect. By suitably depressing the accelerator a locking of the wheels may be prevented.

The operation of the above described servo-brake arrangement is as follows:

The position of the parts illustrated in full lines in Fig. 1 corresponds to the position of the accelerator pedal 1 designated by N, i. e. the neutral position. Thereby the throttle valve is closed so that no gas is supplied to the motor, and the parts of the regulating valve occupy the position illustrated in Fig. 2 in which no braking action occurs. During the running of the car the accelerator pedal is depressed from the neutral position N to the position G indicated in dash and dot lines. In the position G the maximum quantity of gas is supplied to the motor, the throttle valve lever 8 occupies the position indicated in dash and dot lines in which the throttle valve is completely opened as the sleeve 3 is pushed into its position shown in dash and dot lines, whilst the rod 13 is in its extreme left position (also shown in dash and dot lines in Fig. 1) and the regulating valve is in the same position as explained above in which no braking action occurs. When the accelerator is depressed between the positions N and G the supply of gas to the motor is positioned according to the desired speed or to the gradient and the manner of utilizing the accelerator in the range N—G does not differ in any way from that in an ordinary car.

When the foot of the operator permits the accelerator to move by the influence of the spring 2, beyond the position N into the range between N and B the rod 4, sleeve 3, rod 13 and its collar 125 is pulled towards the right, and the parts of the regulating valve occupy the positions indicated in Figs. 6 or 7. The lever 8 of the throttle valve remains in the position in which it abuts against the pin 11 and in which the throttle valve is closed and the rod 5 moves in the sleeve 3. Suction is admitted to the brake cylinder 22 and the braking action starts. When the accelerator has reached the position B (braking position) the piston of the regulating valve admitting suction is completely open and the sleeve 3, rod 13, collar 125 and lever 116 occupy the positions shown in dotted lines; in this position the maximum braking effect is obtained.

The whole braking action is thus released as a logical consequence of the cutting off of the gas supply and so to speak by a passive action of the operator whereby the spring 2 yields the motive power. This action is of great importance with autobusses carrying a large number of passengers as in this case, when the driver suddenly loses the control of his vehicle owing to some physiological trouble, as soon as the foot of the driver releases the accelerator pedal the arrangement acts as a safety brake in a similar manner as the "dead man crank" in vehicles running on rails.

In order to suspend the braking action the accelerator pedal is depressed and when the position N is reached the piston of the regulating valve permits air to enter the conduit 21 and the brake cylinder, the piston 23 is returned into its initial position and the brake is released by the ordinary means provided in the brake mechanism of the car. In the position N the rod 5 abuts against the end of the bore of the tubular member 3 and when the accelerator pedal is further depressed beyond the position N the throttle valve is opened and gas is supplied to the motor.

The arrangement illustrated in Fig. 1 shows the accelerator pedal and the throttle control hand lever operatively connected with each other, so that both serve to actuate and regulate to servo brake mechanism. The range over which the hand gas lever 55 may be turned above the segment 56 at the steering wheel 57 is subdivided into two parts, the ends of which correspond to the positions B, N and G; i. e. in the range N—G the gas supply is controlled by the hand lever and in the range N—B the braking action is so controlled. This subdivision slightly differs from that described above with reference to Fig. 8. At the lower end of the shaft 58 of the hand lever 55, which shaft is mounted in a known manner inside the steering column 59, a lever arm 60 is fixed and a rod 61 sliding in a tubular member 62 is linked to the one arm 63 of a bell crank lever, the other arm 64 of which is provided with a slotted portion 65, which cooperates with a pin 66 fixed in the rod 4 of the accelerator pedal 1. The throttle control hand lever 55 is shown in its neutral position in Fig. 1; when it is turned into the extreme position G the rod 61 resting on the bottom of the tubular member 62 depresses the latter into the position shown in dash and dot lines and the accelerator rod 4 will be displaced towards the left by the cooperation of the bell crank lever 63, 64, 65 and the pin 66 and the throttle valve will be opened to supply gas to the motor. When the hand lever 55 is turned into the position B the rod 61 is lifted and the pressure of the spring 2 is now permitted to shift the accelerator rod 4 towards the right, as the rod 61 acts no longer as a stop to the movement of the tubular member 62, and thereby the braking action occurs. It is thus possible to utilize the hand lever for regulating the gas supply and the braking action. When the driver wishes to utilize the accelerator pedal for regulating the gas supply and the braking action he has to adjust the hand lever to the position B whereupon the use of the accelerator pedal over the whole range G—N—B is unrestricted. When the hand lever 55 is adjusted into the neutral position N a braking action will not occur when the accelerator is released as the members 61, 62 act as a stop.

Figure 9:
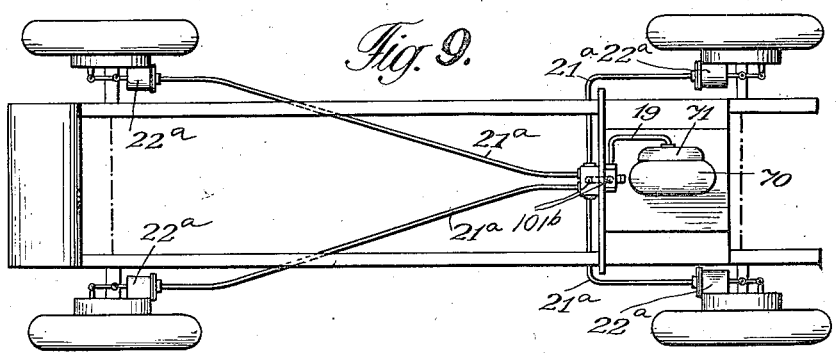
Fig. 9 shows in a plan view the frame of a motor car provided with a modified arrangement of the servo-brake.

Fig. 9 shows a constructional example of a vehicle for the four wheel brakes a separate servo-brake cylinder in which, instead of a single servo-brake cylinder 22$^a$ is provided for each brake. Each cylinder 22$^a$ is connected by means of a suction conduit 21$^a$ to the regulating valve 101$^b$ and a conduit 19 connects the valve 101$^b$ with the suction manifold 71 of the motor 70. The construction and operation of the means for actuating the valve 101$^b$ may be similar to any of the arrangements described above.

Figs. 10 and 11 show the installation of the servo-brake mechanism on a motor car of the Buick type.

The accelerator 1 is mounted on a lever 120 turnable about a pivot pin 121. To the free end of the lever 120 is linked the rod 4$^a$ which is slidingly held in a guide-block 122 attached to the end of a lever 8$^a$ fixed to the shaft of the throttle valve 123 of the carburettor 124. On the opposite end of the shaft of the throttle valve a further lever 8' is fixed on which a helical spring 10 acts. Two collars 125 and 126 are fixed on the rod 4$^a$ of which the collar 125 is adapted to cooperate with the lever 117 of the regulating valve 101. The latter is fixed to the carburettor 124 and connected by the pipe 18 to the air inlet 127 of the carburettor, and by the pipe 19 to the suction manifold 128 of the motor and by the pipe 21 to the cylinder 22 of the servo-brake. A spring 2 is connected to the rod 4$^a$ and tends to return the accelerator 1 into its highest braking position.

The brake cylinder 22 is provided with an upper hollow extension 128 in which a shaft 129 is rotatably mounted and a lever 129' is fixed to said shaft 129. The free end of the lever 129' is connected by means of a chain 130 to the piston 23 on which a compression spring 131 acts. A short lever 132' is fixed to the shaft 129 outside of the extension 128 and the lever 132' is connected by the rod 26 to the brake pedal 25$^a$ and to the brake gear of which the equalizing beam 132 is indicated. The connection between the lever 129' and the piston 23 by means of a chain 130 permits the depression of the brake pedal irrespective of the position of the piston 23.

The interconnection between the hand gas lever 55 and the means for actuating the regulating valve by the accelerator 1 consists of a toothed segment 133 cooperating with the bevel wheel 134 at the end of the shaft 58 operated by the lever 55. The segment 133 is fixed to a vertical shaft 135 to the upper end of which is attached a lever 136 which is linked to a rod 61$^a$. The latter is linked with its other end to a lever arm 137 on a pivot 138 fixed in a bracket 139 which is mounted below the foot board 73. The lever 137 is so positioned that it cooperates with the collar 126 on the rod 4. It will thus be seen that the adjustment of the hand gas lever 55 effects the adjustment of the lever 137 and the latter acts as a stop to the displacement movement of the rod 4 towards the right in Fig. 11 when the accelerator 1 is released for braking so that the desired braking effect can be controlled by the hand gas lever as has been described above.

The servo-brake arrangements described above are suitable for being attached to existing motor cars or other vehicles of any make.

I claim:

1. In a motor driven vehicle, in combination, a servo-brake mechanism operable by suction, a valve to control the admission of suction to said servo-brake mechanism, a throttle valve for controlling the supply of gas to said motor, a hand lever for controlling the throttle valve, an accelerator pedal, means to operatively connect said accelerator pedal to said controlling valve and to connect said accelerator pedal to said throttle valve, both connecting means including a lost motion device, and means to interconnect said means connected to said accelerator pedal to said throttle control hand lever, the latter means including a stop, whereby with the throttle control hand lever adjusted in the braking position a release of the accelerator pedal causes an actuation of said control valve and thereby an operation of the servo-brake mechanism whilst a depression of the accelerator pedal causes said throttle valve to be opened for supplying gas to the motor, and with the throttle control hand lever adjusted in its neutral position the accelerator pedal is locked in its neutral position as regards the braking action which is then prevented when the accelerator pedal is released.

2. In a motor driven vehicle, in combination, a servo-brake mechanism operable by the suction of the explosion motor, a valve to control the admission of suction to said servo-brake mechanism and comprising a casing having an inlet for suction and an inlet for atmospheric air, both inlets being controlled by a tubular valve body having differential pistons of different diameters, a spring acting on one end of said differential piston, a more powerful spring acting on the other end of said differential piston and tending to press the differential piston into the inoperative position, and a lever to cooperate with said differential piston for displacing the latter, said springs in cooperation with the suction on the pistons of different diameters automatically causing a displacement of said piston valve in order to admit suction when the latter has been reduced by leakage losses, a throttle valve for controlling the supply of gas to said motor, an accelerator pedal, and means to operatively connect said accelerator pedal to the lever of said controlling valve and to connect said accelerator pedal to said throttle valve, both connecting means being adapted for unindirectional motion.

In testimony whereof, I have signed my name to this specification.

OTTO J. BADERTSCHER.